US012012786B2

(12) United States Patent
Debroucke et al.

(10) Patent No.: US 12,012,786 B2
(45) Date of Patent: Jun. 18, 2024

(54) ELECTRIC LOCKING MECHANISM OF A DOOR LEAF COMPRISING A MECHANICAL BACKUP FUNCTION

(71) Applicant: MINEBEA MITSUMI Inc., Nagano-ken (JP)

(72) Inventors: Francois Debroucke, Abbeville (FR); Laurent Duriez, Abbeville (FR); Jeremy Paumelle, Abbeville (FR)

(73) Assignee: MINEBEA MITSUMI INC., Nagano-Ken (JP)

( * ) Notice: Subject to any disclaimer, the term of this patent is extended or adjusted under 35 U.S.C. 154(b) by 0 days.

(21) Appl. No.: 17/346,064

(22) Filed: Jun. 11, 2021

(65) Prior Publication Data

US 2021/0388646 A1 Dec. 16, 2021

(30) Foreign Application Priority Data

Jun. 11, 2020 (FR) ..................................... 20/06130

(51) Int. Cl.

*E05B 81/90* (2014.01)
*E05B 81/16* (2014.01)
*E05B 81/24* (2014.01)
*E05B 81/28* (2014.01)
*E05B 81/42* (2014.01)

(52) U.S. Cl.

CPC .............. *E05B 81/90* (2013.01); *E05B 81/16* (2013.01); *E05B 81/28* (2013.01); *E05B 81/42* (2013.01); *E05B 81/25* (2013.01)

(58) Field of Classification Search

CPC .......... E05B 81/16; E05B 81/42; E05B 81/20; E05B 81/90; E05B 81/25; E05B 81/28; E05B 81/14; E05B 47/02

See application file for complete search history.

(56) References Cited

U.S. PATENT DOCUMENTS 4,518,180 A * 5/1985 Kleefeldt ................ E05B 81/20 292/216
4,927,196 A 5/1990 Girard et al.

(Continued)

FOREIGN PATENT DOCUMENTS

EP 3284887 2/2018

*Primary Examiner* — Kristina R Fulton
*Assistant Examiner* — Emily G. Brown
(74) *Attorney, Agent, or Firm* — Burris Law, PLLC

(57) ABSTRACT

A locking mechanism of a door leaf of a motor vehicle includes a latch, an electric actuator, and a transmission arrangement. The latch includes a pawl and a bolt configured to cooperate in such a manner to allow the locking or unlocking of the door leaf. The transmission arrangement is configured to transmit a movement of the electric actuator to the bolt in order to displace the bolt of the latch between an unlocking position in which the bolt is released from the pawl and a locking position in which the bolt is blocked by the pawl. The transmission arrangement includes a downstream transmission member configured to transmit a movement to the bolt, an upstream transmission member configured to transmit a movement of the actuator to the downstream transmission member; and a blocking member movable relative to the downstream transmission member and/or the upstream transmission member.

7 Claims, 10 Drawing Sheets

1

(56) References Cited

U.S. PATENT DOCUMENTS

| | | | | |
|---|---|---|---|---|
| 6,471,259 | B1 * | 10/2002 | Weyerstall | E05B 81/14 292/216 |
| 10,378,252 | B2 * | 8/2019 | Ottino | E05B 81/68 |
| 10,895,095 | B2 * | 1/2021 | Cumbo | E05B 81/68 |
| 2010/0117379 | A1 * | 5/2010 | Mitchell | E05B 85/02 292/201 |
| 2011/0187132 | A1 * | 8/2011 | Scholz | E05B 81/20 292/226 |
| 2014/0049056 | A1 * | 2/2014 | Scholz | E05B 85/243 292/200 |
| 2018/0171679 | A1 * | 6/2018 | Im | E05B 81/34 |
| 2018/0258671 | A1 * | 9/2018 | Graute | E05B 81/50 |
| 2020/0024872 | A1 * | 1/2020 | Ney | E05B 77/32 |

* cited by examiner

ELECTRIC LOCKING MECHANISM OF A DOOR LEAF COMPRISING A MECHANICAL BACKUP FUNCTION

CROSS-REFERENCE TO RELATED APPLICATIONS

This application claims priority to and the benefit of French Patent Application FR 20/06130, filed on Jun. 11, 2020. The disclosure of the above application is incorporated herein by reference.

FIELD

The present disclosure relates to an electric locking mechanism of a door leaf of a motor vehicle and more particularly of a rear door leaf, such as a trunk, of a motor vehicle.

BACKGROUND

The statements in this section merely provide background information related to the present disclosure and may not constitute prior art.

The electric locking and/or closing functions, with assistance for closing the door leafs, are more and more frequent on vehicle tailgates. The user can thus remotely control the opening and closing of his tailgate. Electric cylinders perform the opening and closing of the tailgate, while a latch performs the closing or opening of the door leaf.

Electrically assisted opening or closing latches perform the function using an actuator which controls either a pawl to open or a bolt to close the door leaf.

In the case where an element of the electric locking mechanism is defective, for example a loss of voltage, a burnt out motor or a rusted motor, it is no longer possible to electrically drive the latch and it becomes desired to perform an backup mechanical function.

Regarding the opening, it is known to directly or indirectly drive the pawl to tilt it and open the latch.

For the closing, there is a mechanical or electromechanical friction unblocking solution, which allows the bolt to be pulled in order to disconnect the bolt from the electric locking mechanism to release the latter.

However, this solution has many drawbacks because it is complex and expensive to implement.

Finally, many products do not have a mechanical backup solution.

There is therefore a risk that the latch will get blocked. The user may believe that the latch is closed, that is to say the pawl is blocking the bolt, when it is in fact the blocked motor that is inhibiting the bolt from rotating.

SUMMARY

This section provides a general summary of the disclosure and is not a comprehensive disclosure of its full scope or all of its features.

The present disclosure provides a locking mechanism for a motor vehicle door leaf comprising a latch, an electric actuator, and a transmission arrangement. The latch locks the door leaf comprising a pawl and a bolt configured to cooperate so as to allow the locking or unlocking of the door leaf. The transmission arrangement is configured to transmit a movement of the electric actuator to the bolt in order to displace the bolt of the latch between an unlocking position in which the bolt is released from the pawl and a locking position in which the bolt is blocked by the pawl. The transmission arrangement comprises a downstream transmission member, an upstream transmission member, and a movable blocking member. The downstream transmission member is configured to transmit a movement to the bolt. The upstream transmission member is configured to transmit a movement from the actuator to the downstream transmission member. The movable blocking member is relative to the downstream transmission member and/or the upstream transmission member. The blocking member is configured to define, with the upstream transmission member and/or the downstream transmission member, a relative blocking position in which the blocking member cooperates with the upstream transmission member and/or the downstream transmission member so as to allow the transmission of a movement between the upstream transmission member and the downstream transmission member, and a relative unblocking position in which the blocking member is movable according to at least one degree of freedom with respect to the upstream transmission member and/or the downstream transmission member.

This locking mechanism therefore allows it to be easily handled in the case of an electrical malfunction of the vehicle, in particular by the transmission arrangement of this locking mechanism.

The term "locking", can also mean door leaf closure, in particular an electric locking or closing of the door leaf. In the same way, the term "unlocking" can mean door leaf opening, in particular an unlocking or an electric opening of the door leaf.

Within the meaning of the present disclosure, the fact that the blocking member is movable according to at least one degree of freedom with respect to the upstream transmission member and/or the downstream transmission member in the relative unblocking position means that there is at least one additional degree of freedom between the blocking member and the upstream transmission member and/or the downstream transmission member in the relative unblocking position with respect to the relative blocking position.

It is understood that the transmission arrangement is formed by a transmission chain comprising the upstream transmission member, the blocking member, and the downstream transmission member. In other words, the transmission chain comprises the blocking member.

In the relative unblocking position, the upstream transmission member and the downstream transmission member are no longer engaged with each other.

It is understood that one of the upstream transmission member and the downstream transmission member is permanently connected to the blocking member. The other of the upstream transmission member and the downstream transmission member is removably connected to the blocking member.

In particular, in the relative blocking position, the blocking member is connected to the upstream transmission member and to the downstream transmission member.

For example, in the relative unblocking position, the blocking member is connected to the upstream transmission member and disengaged from the downstream transmission member or the blocking member is connected to the downstream transmission member and disengaged from the upstream transmission member.

The term "connected" means that the blocking member is engaged or cooperates with the upstream transmission member and/or the downstream transmission member so as to allow or not allow the transmission of a movement from the actuator towards the bolt.

The blocking member can be directly or indirectly connected to the upstream transmission member.

The blocking member can be directly or indirectly connected to the downstream transmission member.

It is understood that the actuator is configured to displace the bolt into a locking position, in which the bolt cooperates with the pawl so as to lock the door leaf.

It is understood that the actuator is configured to displace the bolt into an unlocked position, in which the bolt is released from the pawl so as to unlock the door leaf.

For example, the locking mechanism comprises a return element, configured to return the bolt to the unlocked position.

Thus, in the relative unblocking position, when the upstream transmission member and the downstream transmission member are disengaged, the return element returns the bolt to the unlocking position and the door leaf is unlocked.

For example, the return element is a spring. For example, the return element is an elastic blade such as a metal blade.

According to one example, the blocking member is connected to a mechanical backup system. The mechanical backup system is configured to trigger a passage between the relative blocking position and the relative unblocking position of the blocking member and the upstream transmission member and/or the downstream transmission member.

The mechanical backup system makes it possible to disconnect the transmission arrangement in order to resolve the electrical malfunction, unlike the prior art where the bolt had to be disconnected from the mechanism.

In particular, the mechanical backup system can be actuated manually by a user, in order to displace the blocking member and to disengage the downstream transmission member from the upstream transmission member, then being in the relative unblocking position.

According to one example, the blocking member comprises a cam surface configured to displace the blocking member under the effect of a thrust from the upstream transmission member and/or the downstream transmission member so as to position the upstream transmission member and/or the downstream transmission member and the blocking member in the relative blocking position.

Once the electrical malfunction has been repaired, the locking mechanism can be reset to electrically lock the door leaf.

It is understood that the blocking member, the upstream transmission member and the downstream transmission member are configured to move from the relative unblocking position to the relative blocking position. The passage from the relative unblocking position to the relative blocking position can be achieved by sliding the upstream transmission member or the downstream transmission member against the cam surface of the blocking member. The upstream transmission member or the downstream transmission member can be manually displaced against the cam surface of the blocking member.

According to another example, the downstream transmission member comprises a cam surface configured to guide the blocking member relative to the downstream transmission member under the effect of a rotation of the upstream transmission member so as to position the upstream transmission member and the blocking member in the relative blocking position.

According to another example, the blocking member is movable between an open position in which the upstream transmission member and/or the downstream transmission member can move from the relative blocking position to the relative unblocking position and a closing position in which the blocking member is opposed to the passage from the blocking position to the unblocking position.

Thus, the blocking member and the upstream transmission member and/or the downstream transmission member are disconnected to repair the electrical malfunction.

According to one example, the blocking member comprises a contact surface configured to come into contact with the upstream transmission member and/or the downstream transmission member. The blocking member is guided between the closing position and the opening position along a path comprised in the plane of the contact surface.

The contact surface makes it possible to reduce the efforts to disconnect the upstream transmission member and/or the downstream transmission member and the blocking member.

According to one example, the blocking member is movable in rotation about an axis of rotation. The contact surface is oriented perpendicular to a segment connecting the axis of rotation to said surface.

According to one example, the downstream transmission member and/or the upstream transmission member comprises a return means or return device configured to exert a return force on the blocking member towards the closing position of said blocking member.

For example, the return means is a spring. For example, the return means is an elastic blade, such as a metal blade.

According to one example, the downstream transmission member and/or the upstream transmission member comprises a stop configured to block the blocking member in the closing position.

Thus, the return means and the stop allow the blocking member to be self-locked in the blocked position and in the closing position.

According to another example, the blocking member is configured to be displaced from the closing position to the open position by mechanical traction of the mechanical backup system. For example, the mechanical backup system can be manually towed.

According to another example, the cam surface is configured to displace the blocking member under the effect of a thrust from the upstream transmission member between the closing position of the blocking member and the open position of the blocking member.

The displacement of the blocking member from the closing position to the open position allows the blocking member and the upstream transmission member to be reconnected.

According to one example, the downstream transmission member comprises an opening configured to receive at least part of the upstream transmission member.

According to one example, the closing position is defined by a relative positioning of the blocking member with respect to the opening of the downstream transmission member. In particular, the closing position corresponds to a position in which the blocking member defines with the opening a blocking location of the transmission member whose dimensions correspond to that of a blocking portion of the transmission blocking member.

According to one example, the open position is defined by a relative positioning of the blocking member with respect to the opening.

According to one example, the housing is configured to allow its displacement between the relative blocking position and the relative unblocking position.

The present disclosure also concerns a motor vehicle comprising the locking mechanism.

The locking mechanism of the present disclosure will be described in more detail through the different figures presented below, which will facilitate its understanding.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
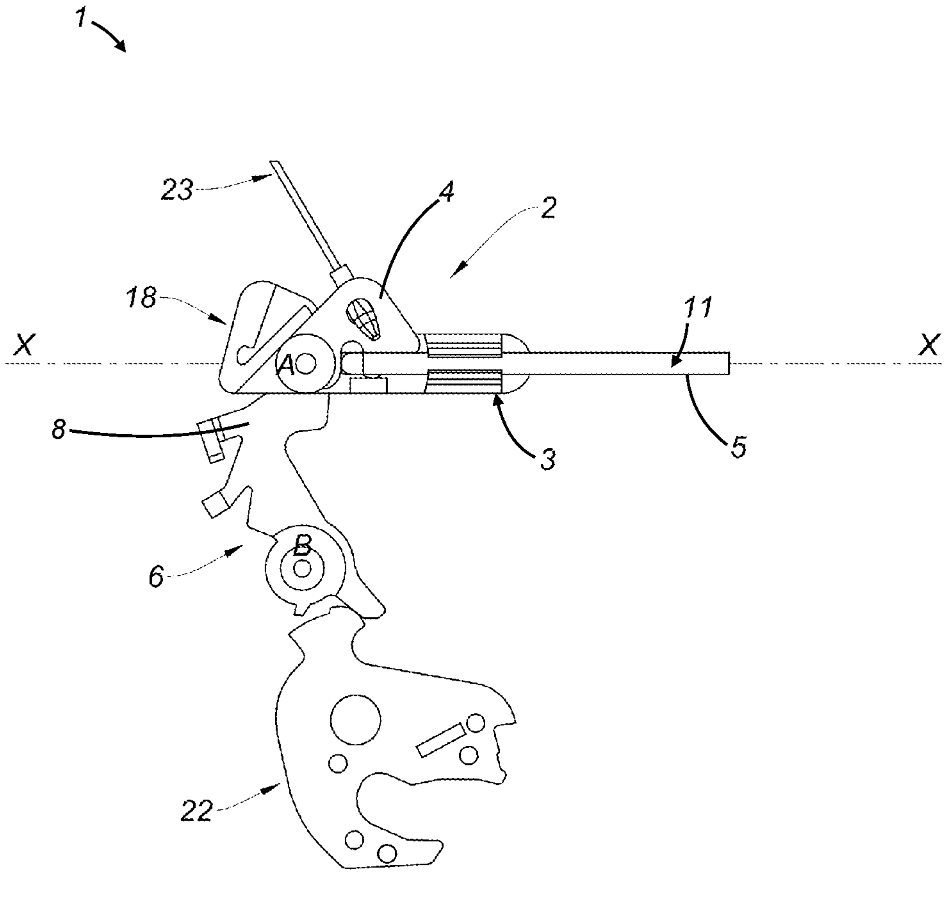
FIG. 1 is a partial side view of the locking mechanism, in accordance with a first form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following description, the terms "upstream" and "downstream" should mean the position of the parts making up the transmission arrangement with respect to the direction of movement transmitted by each of these parts. In particular, "downstream" means which approaches the latch (32), "upstream" approaches the locking/unlocking control electric actuator 24.

FIG. 1 shows a portion of the locking mechanism 1 of a latch 32 (represented in FIG. 10) and more particularly a transmission arrangement 2 comprising a blocking member 4, an upstream transmission member 5 and a downstream transmission member 8 comprising a support 3 and a lever portion 6.

The support 3, extending along a longitudinal axis XX, comprises an opening 7, for example an oblong hole, extending along a parallel axis relative to the longitudinal axis XX.

The upstream transmission member 5 intended to be connected to an actuator, for example a rod or a cable, consists of a first portion 11 extending parallel to the longitudinal axis XX and of a second portion (not visible) extending transversely with respect to the longitudinal axis XX so as to be inserted through the opening 7 of the support 3.

The blocking member 4, for example a hook, is configured to be movable in rotation, with respect to an axis of rotation A, transverse to the longitudinal axis XX, between a relative blocking position, in which the blocking member 4 cooperates with the upstream transmission member 5 as illustrated in this figure, and a relative unblocking position in which the blocking member 4 is movable according to at least one degree of freedom with respect to the upstream transmission member 5.

More precisely, the blocking member 4 comprises a housing 13 configured to receive the second portion of the upstream transmission member 5, the relative blocking position corresponding to an engagement of the blocking member 4 with the upstream transmission member 5.

This engagement results in the contact between the upstream transmission member 5 and a contact surface 12 formed by the housing 13 of the blocking member 4. The contact surface 12 being oriented perpendicular to a segment connecting the axis of rotation A to the contact surface 12. The contact surface 12 being visible in FIG. 5A.

Figure 2:
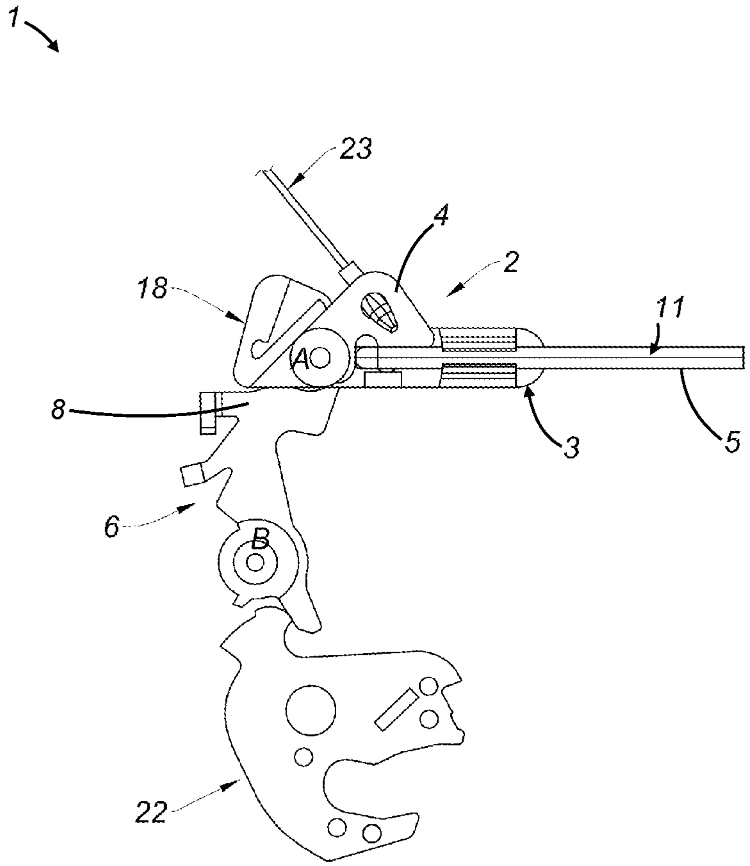
FIG. 2 is another partial side view of the locking mechanism of FIG. 1.
Figure 3:
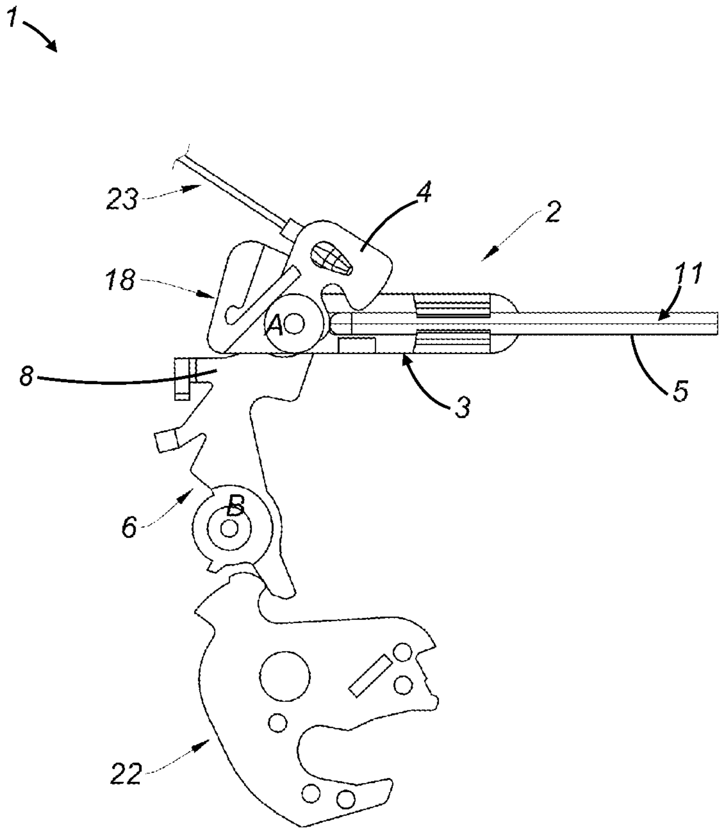
FIG. 3 is a partial side view of the locking mechanism of FIG. 1 when a mechanical backup system is activated.
Figure 4:
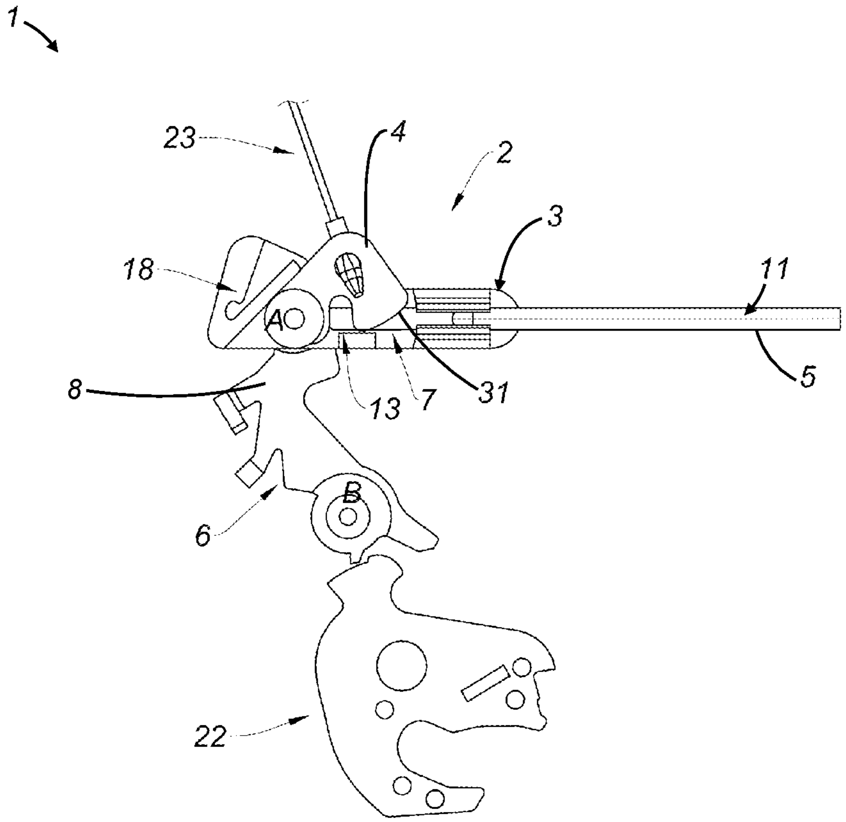
FIG. 4 is a partial side view of the locking mechanism of FIG. 1, when the blocking member is in a closing position.
Figure 5A:
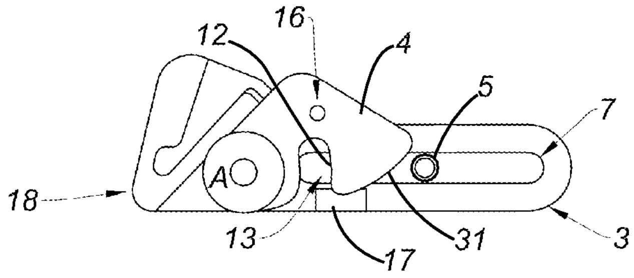
FIG. 5A is a partial side view of the locking mechanism of FIG. 1, in a first step making it possible to reset this locking mechanism.

The blocking member 4 also comprises an orifice 16 configured to receive a mechanical backup system 23 represented in FIGS. 1 to 4, such as a cable or a rod for example. Thus, when the mechanical backup system 23 is mechanically towed, the blocking member 4 is displaced around the axis of rotation A from a closing position, in which the blocking member 4 opposes the passage of the blocking position to the unblocking position, as illustrated in FIGS. 4 and 5A, to an open position in which the upstream transmission member 5 can move from the relative blocking position to the relative unblocking position, as represented in FIG. 5C for example.

According to another form, the mechanical backup system 23 is integrated directly into the blocking member 4. In other words, the blocking member 4 and the mechanical backup system form a single piece.

More specifically, the orifice 16 is disposed in the plane of the contact surface 12 of the blocking member 4.

The mechanical traction can be achieved according to a movement substantially perpendicular to the segment connecting the axis of rotation A to the contact surface 12 of the blocking member 4.

It should be noted that the aforementioned movement is not limiting of the present disclosure.

The support 3 comprises a stop 17 extending transversely outwardly with respect to the longitudinal axis XX.

This stop 17 is configured to block the blocking member 4 in rotation in its closing position when the blocking member 4 is movable from its open position to its closing position.

The support 3 also comprises a return means 18, for example a tongue, as illustrated in this figure, or a spring.

The return means 18 is configured to block the rotation of the blocking member 4 from its closing position to its open position by the return of the blocking member 4 to its closing position, as illustrated in FIGS. 4 and 5A for example.

In other words, the closing position is defined by a relative positioning of the blocking member 4 with respect to the opening 7 of the support 3.

In particular, the closing position of the blocking member 4 corresponds to a position in which the blocking member 4 defines with the opening 7, a blocking location of the upstream transmission member 5 whose dimensions correspond to that of a blocking portion of the upstream transmission member 5.

Figure 5B:
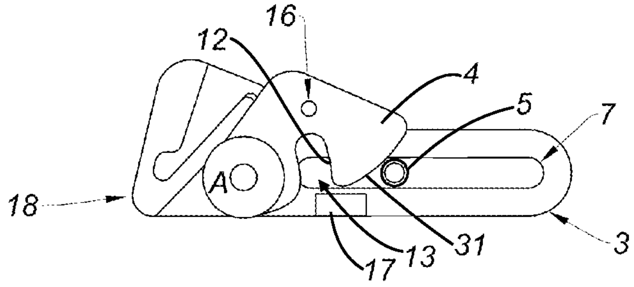
FIG. 5B is a partial side view of the locking mechanism of FIG. 1, in a second step making it possible to reset this locking mechanism.
Figure 5C:
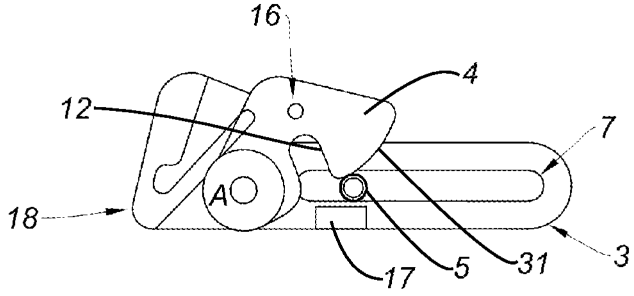
FIG. 5C is a partial side view of the locking mechanism of FIG. 1, in a third step allowing to reset this locking mechanism.
Figure 5D:
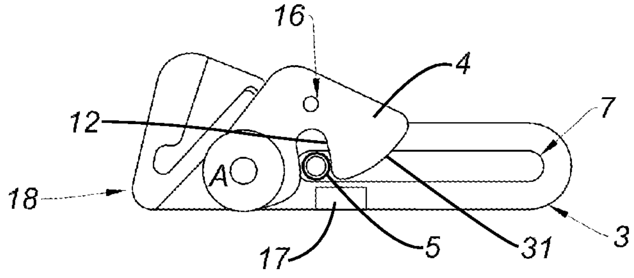
FIG. 5D is a partial side view of the locking mechanism of FIG. 1, in a fourth step allowing to reset this locking mechanism.
Figure 5E:
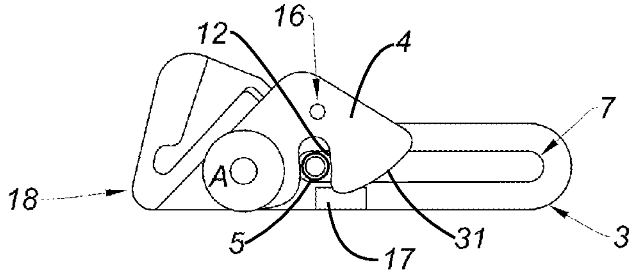
FIG. 5E is a partial side view of the locking mechanism of FIG. 1, in a fifth step allowing to reset this locking mechanism.

Indeed, the second portion of the upstream transmission member 5 is dimensioned so that this second portion of the upstream transmission member 5 can be inserted into the housing 13 of the blocking member 4, as represented in FIGS. 1 and 5E for example.

In addition, the housing 13 of the blocking member 4 is disposed opposite the opening 7 of the support 3, in the closing position.

The open position, for its part, is also defined by a relative positioning of the blocking member 4 with respect to the opening 7 of the support 3.

Indeed, when the blocking member 4 is in the open position, the housing 13 is no longer facing the opening 7 of the support 3.

The housing 13 is therefore configured to allow its displacement between the relative blocking position and the relative unblocking position.

The lever portion 6 is movable in rotation relative to the support 3 along an axis of rotation B.

The axis of rotation B of the lever portion 6 is located on the same plane as the axis of rotation A of the blocking member 4.

It should be noted that the blocking member 4 is disposed on a first face 21 of the support 3 and that the lever portion 6 is disposed on a second face of the support 3, opposite to the first face 21.

FIGS. 1 and 2 show the locking mechanism 1 comprising the transmission arrangement 2 in which the blocking member 4 is in the relative blocking position.

The lever portion 6 is in contact with the bolt 22.

This results in the actuation of the actuator 24 (illustrated in FIG. 10) exerting a pulling force on the upstream transmission member 5.

FIG. 3 shows the locking mechanism 1 in which the mechanical backup system 23 has been actuated.

Indeed, this results in the passage of the blocking member 4 from the relative blocking position, as represented in FIGS. 1 and 2, to the relative unblocking position.

The return means 18 is therefore compressed by the blocking member 4 under the effect of the exerted traction force.

The blocking member 4 and the upstream transmission member 5 therefore no longer cooperate.

FIG. 4 shows the locking mechanism 1 when the blocking member 4 is in the closing position.

Indeed, once the relative unblocking position of the blocking member 4 has been obtained, the upstream transmission member 5 is no longer located in the housing 13 of the blocking member 4 and can be movable in the opening 7 of the support 3.

Once the mechanical backup system 23 has been released, the blocking member 4 is in the closing position as illustrated in this figure, in particular by the return force exerted by the return means 18.

FIGS. 5A to 5E show different steps allowing to reset of the locking mechanism when the mechanical backup system 23 has been used, for example in the event of an electrical malfunction of the locking mechanism 1 of the door leaf of a motor vehicle.

The resetting is carried out by the passage of the blocking member 4 from its closing position to its open position to finally find itself in the relative blocking position.

The blocking member 4 comprises a cam surface 31 configured to displace the blocking member 4, under the effect of a thrust from the upstream transmission member 5, so as to position the upstream transmission member 5 and the blocking member 4 in the relative blocking position, as represented in FIG. 5E.

In FIG. 5A, the upstream transmission member 5 no longer cooperates with the blocking member 4. Indeed, the mechanical backup system 23 has been executed. This results in a closing position of the blocking member 4, by the return means 18 and the stop 17.

In FIG. 5B, the upstream transmission member 5 comes into contact with the cam surface 31 of the blocking member 4.

More precisely, it is the second portion of the upstream transmission member 5, which, through the displacement in the opening 7 of the support 3, will come into contact with the cam surface 31 of the blocking member 4.

In FIG. 5C, the upstream transmission member 5 runs along the cam surface 31 of the blocking member 4, allowing the blocking member 4 to move from its closing position to its open position.

In this position, the return means 18 is compressed by the blocking member 4.

In FIG. 5D, the upstream transmission member 5 is in contact with the contact surface 12 of the blocking member 4.

In FIG. 5E, the blocking member 4 and the upstream transmission member 5 are secured to each other and therefore cooperate with each other. Indeed, the blocking member 4 and the upstream transmission member are in the relative blocking position.

In the following paragraphs, the operation of the locking mechanism 1 of the present disclosure according to the first form is detailed.

When electrically locking a motor vehicle door leaf, for example a motor vehicle trunk, a user can electrically control this electric locking remotely.

When the electrical locking of the door leaf takes place correctly, an actuator 24 (illustrated in FIG. 10) such as an electric motor, will exert a traction force on the upstream transmission member 5, according to a translatory movement and according to the longitudinal axis XX of extension of the support 3.

The upstream transmission member 5 is secured to the blocking member 4, resulting in the contact of the upstream transmission member 5 with the contact surface 12 of the blocking member 4.

The blocking member 4 therefore comprises a contact surface 12 configured to come into contact with the upstream transmission member 5 and/or the downstream transmission member 8. The blocking member 4 being guided between the closing position and the open position along a path comprised in the plane of the contact surface 12.

More specifically, the blocking member 4 is movable in rotation about an axis of rotation A. The contact surface 12 being oriented perpendicularly to a segment connecting the axis of rotation A to said surface 12.

The upstream transmission member 5 is therefore configured to displace the support 3 by means of the electric actuator 24, when the blocking member 4 is in the relative blocking position, the upstream transmission member 5 passing through the opening 7 of the support 3

The lever portion 6 will therefore be rotated along the axis of rotation B by the displacement of the support 3. Thus acting on the latch 32 of the door leaf, and more particularly on the bolt 22 of the latch 32 in order to lock the door leaf.

Indeed, the lever portion 6 is connected to the support 3 by means of a pivot connection, coincident with the axis of rotation A of the blocking member 4, at the level of the second face of the support 3.

In the event of any electrical malfunction of the door leaf or of the vehicle, the transmission arrangement 2 as represented in FIG. 1 is blocked in this position for example. That is to say in the relative blocking position, and the locking position of the door leaf cannot therefore be reached.

The user may therefore believe that the door leaf of his vehicle is locked when it is not.

In order to unblock the locking mechanism 1 of its door leaf, the user exerts a traction force on the mechanical backup system 23 thus causing the disconnection of the upstream transmission member 5 and the blocking member 4 by the rotation of the blocking member 4 according to the axis of rotation A.

In other words, the blocking member 4 is displaced from its closing position to its open position, allowing the upstream transmission member 5 to no longer be locked in the housing 13 of the blocking member 4.

Once the disconnection has been made, the upstream transmission member 5 will be able to move freely through the opening 7 of the support 3.

The return means 18 will drive the blocking member 4 into its closing position, that is to say without the upstream transmission member 5 and the blocking member 4 being secured to each other, as represented in FIGS. 4, 5A. In order to reset the locking mechanism 1, the user displaces the upstream transmission member 5 until it comes into contact with the cam surface 31 of the blocking member 4.

Indeed, the cam surface 31 of the blocking member 4 is located on the passage of the opening 7 of the support 3, when the blocking member 4 is in the closing position, as represented in FIGS. 4 and 5A, so that when the upstream transmission member 5 is displaced through the opening 7 of the support 3, and when the latter meets the blocking member 4, and more particularly the cam surface 31 of the blocking member 4, the blocking member 4 passes from its closing position to its open position, as illustrated in FIGS. 5B and 5C.

A thrust of the upstream transmission member 5 on the cam surface 31 of the blocking member 4 therefore makes it possible to reposition the upstream transmission member 5 and the blocking member 4 in the relative blocking position as represented in FIG. 5E.

More specifically, the blocking member 4, by the return means 18, will return to its relative blocking position.

The return means 18 and the stop 17 are self-locking means of the blocking member 4 in its closing position and in its relative blocking position.

Once these steps have been carried out and the electrical malfunction is resolved, the electrical locking of the latch 32 can be electrically carried out.

Figure 6:
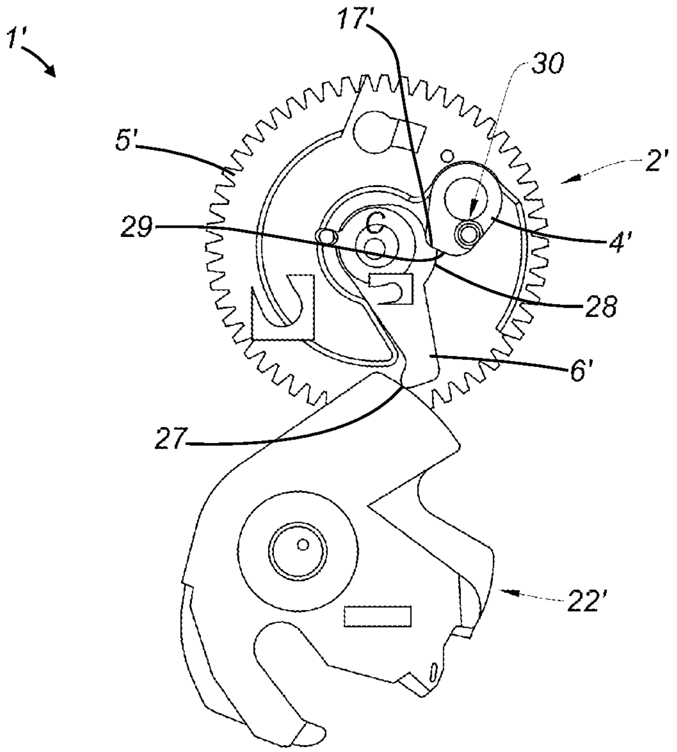
FIG. 6 is a partial side view of the locking mechanism, in accordance with a second form of the present disclosure.

FIG. 6 shows the locking mechanism 1' according to a second form of the present disclosure.

The locking mechanism 1' comprises a latch 32 for locking the door leaf comprising a pawl 25 and a bolt 22' configured to cooperate to allow the door leaf to be locked or unlocked.

The locking mechanism comprises an electric actuator 24 and a transmission arrangement 2' configured to transmit a movement of the electric actuator 24 to the bolt 22' for displacing the bolt 22' of the latch 32 between an unlock position in which the bolt 22' is released from the pawl and a locking position in which the bolt 22' is blocked by the pawl.

Figure 10:
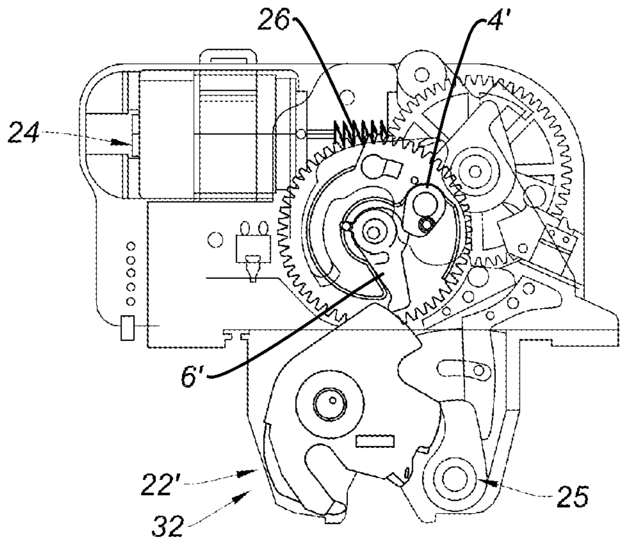
FIG. 10 is a front view of the locking mechanism of FIG. 6.

As can be seen in FIG. 10, the electric actuator 24 comprises an output shaft driven in rotation and provided with a worm screw 26.

The transmission arrangement 2' comprises an upstream transmission member 5'. The upstream transmission member 5' is produced in the form of a toothed wheel mounted to be movable in rotation about an axis C which cooperates with the worm screw 26. Thus the worm screw 26 can drive in rotation of the upstream transmission member 5' around the axis C.

The transmission arrangement 2' comprises a downstream transmission member 6' produced in the form of a lever to be movably mounted in rotation.

In particular, the downstream transmission member 6' can be movably mounted in rotation about the same axis C of rotation of the upstream transmission member 5'.

The downstream transmission member 6' comprises a first stop 27 for driving the bolt 22'. The downstream transmission member 6' also comprises a second blocking stop 17', as well as a cam surface 28 disposed adjacent to the second blocking stop 17'.

The upstream transmission member 5' is configured to transmit a movement from the actuator 24 to the downstream transmission member 6' and the downstream transmission member 6' is configured to transmit a movement to the bolt 22'.

The transmission arrangement 2' comprises a blocking member 4' movably mounted in rotation about an axis of rotation C relative to the upstream transmission member 5'.

In particular, the axis of rotation C is parallel to the axis of rotation of the downstream transmission member 6' and positioned in an offset manner. The blocking member 4' comprises an extension portion 29 intended to abut against the second blocking stop 17' of the downstream transmission member 6'.

The blocking member 4' is configured to define with the downstream transmission member 6' a relative blocking position in which the blocking member 4' cooperates with the downstream transmission member 6' so as to allow the transmission of a movement between the upstream transmission member 5' and the transmission member downstream 6', and a relative unblocking position in which the blocking member 4' is movable according at least one degree of freedom with respect to the upstream transmission member 5'.

In this form, in the relative unblocking position, the rotation around the axis C of rotation of the downstream transmission member 6' with respect to the upstream transmission member 5' is permitted, thus providing an additional degree of freedom compared to the relative blocking position.

In particular, in the relative blocking position, the extension portion 29 of the blocking member 4' cooperates with the second blocking stop 17' of the downstream transmission member 6'.

In the relative blocking position, the upstream transmission member 5' and the downstream transmission member 6' are secured in movement, thanks to the mechanical connection made by the blocking member 4'. The first drive stop 27 of the downstream transmission member 6' can drive the bolt 22' into a locking position shown in FIG. 7.

In the relative unblocking position, the extension portion 29 of the blocking member 4' is in contact with the cam surface 28 and slides over this cam surface 28.

Figure 7:
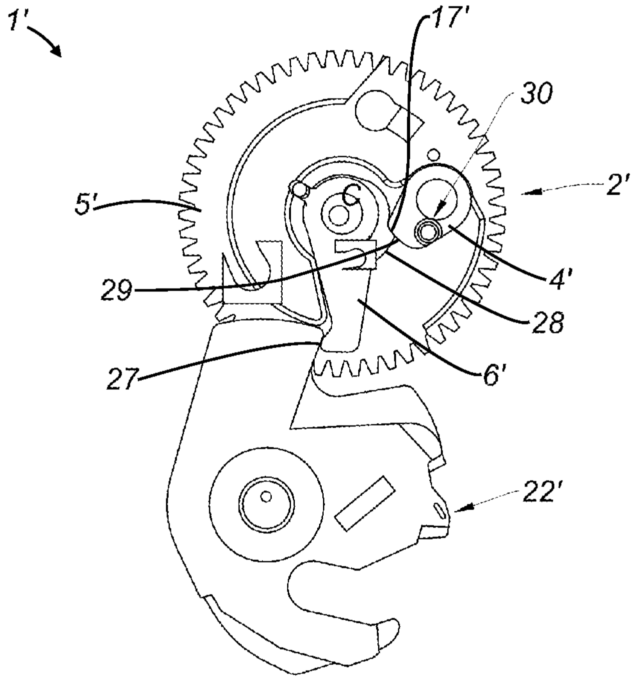
FIG. 7 is a partial side view of the locking mechanism of FIG. 6.
Figure 9:
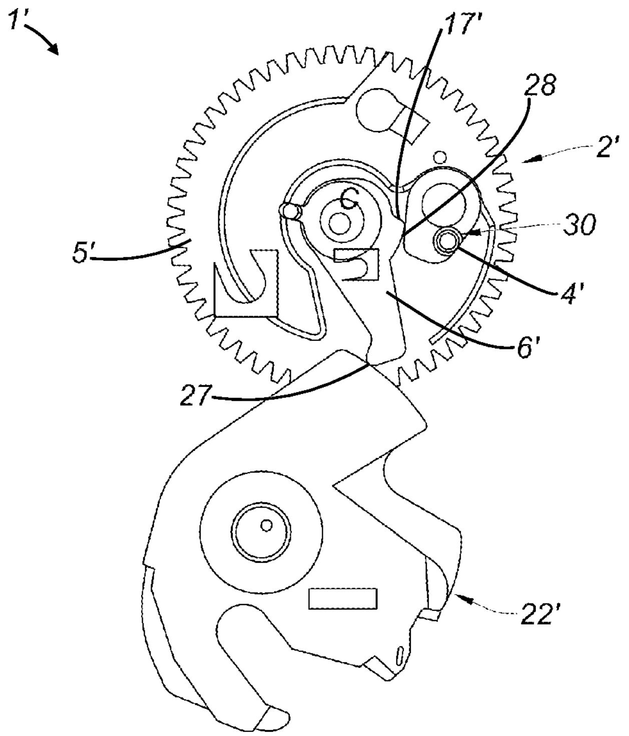
FIG. 9 is a partial side view of the locking mechanism of FIG. 6 when the blocking member is in a closing position.

The blocking member 4' is connected to a mechanical backup system 23' being configured to trigger a movement of the blocking member 4' from a closing position, in which the blocking member 4' is opposed to the passage from the blocking position to the unblocking position, as illustrated in FIG. 9, and an open position in which the upstream transmission member 5' can move from the relative blocking position to the relative unblocking position, as shown in FIG. 7.

In particular, the blocking member 4' is connected to the mechanical backup system 23', including for example a rod or a cable, by means of a pivot 30 disposed in an offset manner with respect to the axis of rotation. Thus, a traction on the mechanical backup system 23' makes it possible to drive the blocking member 4' in rotation about the axis and thus release the rotational movement of the downstream transmission member 6' with respect to the upstream transmission member 5'.

Mechanical traction can be achieved in a substantially perpendicular movement relative to the axis of rotation C of the upstream transmission member 5'.

In this position, the downstream transmission member 6' which is free to rotate no longer constrains the bolt 22', which allows the door leaf to be unlocked.

According to one variation, a return member (not represented) can be associated with the blocking member 4', for example a spring.

The return member is located on the axis of rotation of the blocking member 4'.

According to another variation, the return member is located on the axis of rotation of the downstream transmission member 6'. In this case, the return member is offset relative to the blocking member 4'.

The return member being configured to return the blocking member 4' to its closing position.

According to one variation, the downstream transmission member 6' may also comprise a return member (not represented), for example a spring.

The blocking member is located on the axis of rotation of the downstream transmission member 6'.

This spring allows the downstream transmission member 6' to return towards the relative blocking position with the blocking member 4'.

In the following paragraphs, the operation of the locking mechanism 1' of the present disclosure according to the second form is detailed.

In a normal operating mode of the electric locking of a motor vehicle door leaf, for example of a motor vehicle trunk, a user can electrically and remotely control the electric locking by means of the electric actuator 24, illustrated in FIG. 10.

The output shaft of the actuator 24 drives the upstream transmission member 5' in rotation about the axis C. The upstream transmission member 5' drives the downstream transmission member 6' around the axis C, the blocking member 4' ensuring the engagement in movement of the upstream transmission member 5' and of the downstream transmission member 6'.

The downstream transmission member 6' cooperates with the bolt 22' to displace it to its closing position, as shown in FIG. 6 or to allow its opening as shown in FIG. 7.

In the event of an electrical malfunction of the actuator 24 or the actuator control 24, the transmission arrangement 2' may be blocked.

Figure 8:
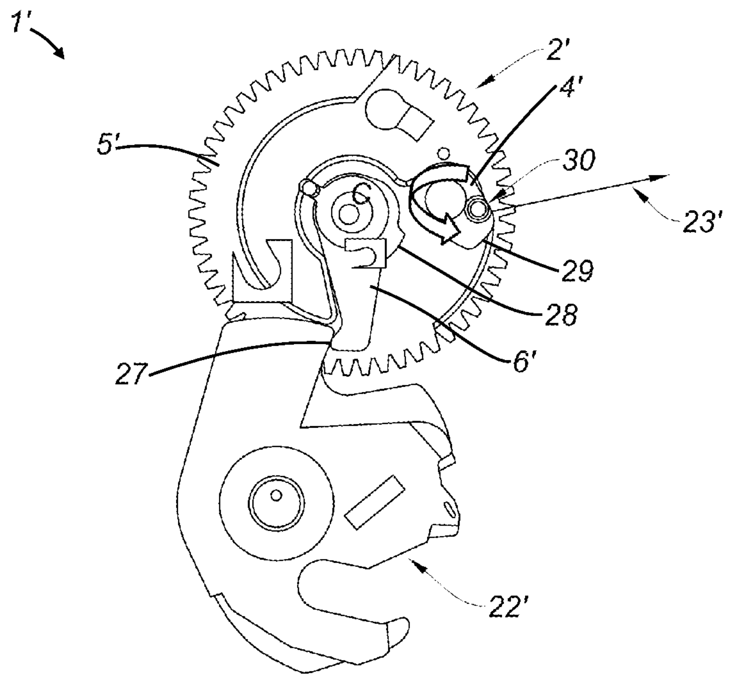
FIG. 8 is a partial side view of the locking mechanism of FIG. 6 when a mechanical backup system is actuated.

In order to unblock the locking mechanism 1' of the door leaf, the user directly or indirectly exerts a traction force on the mechanical backup system 23' thus causing the disconnection of the upstream transmission member 5 and the blocking member 4 by the rotation of the blocking member 4 along the axis of rotation parallel to the axis of rotation C of the upstream transmission member 5', as can be seen in FIG. 8.

In other words, the blocking member 4' is displaced from its closing position to its open position, allowing the downstream transmission member 6' to be free to rotate relative to the upstream transmission member 5'. The bolt 22' is then released and the latch 32 of the door leaf can be opened.

In order to reset the locking mechanism 1', once the malfunction of the actuator 24 or of the actuator control 24 is resolved, it suffices to drive in rotation the upstream transmission member 5' in an unlocking direction so as to remove the contact between the bolt 22' and the downstream transmission member 6'.

The downstream transmission member 6' is then returned in rotation to the relative blocking position thanks to the return member. At the same time, the extension portion 29 of the blocking member 4' bears, under the effect of the return member against the cam surface 28, until it exceeds the blocking stop 17'.

Once past the blocking stop 17', the blocking member 4' is folded by the return member into the closing position which corresponds to the relative blocking position with the downstream transmission member 6', as represented in FIG. 9.

Once these steps have been carried out, the electric locking of the latch 32 can be electrically carried out again.

The advantages conferred by the present disclosure are as follows.

The mechanical backup system 23, 23' makes it possible to secure the locking/unlocking of the door leaf of the vehicle mechanically when an electrical malfunction affects the motor vehicle.

The solution therefore makes it possible to release the bolt 22, 22' from the transmission arrangement 2, 2' and endeavors to reduce the forces to disconnect the upstream transmission member 5, 5' and the blocking member 4, 4'.

Finally, this solution seeks to reset the transmission arrangement 2, 2' when the locking mechanism 1, 1' becomes functional again.

Thanks to this design, the activation of the mechanical backup system 23 only involves the frictional force to release the function of the transmission arrangement 2. Indeed, the electric traction force of the actuator 24 becomes a mechanical traction force of the blocking member 4, via the friction at the level of the contact surface 12.

It should be noted that it is also possible for the function of the mechanical backup locking system to be common with the mechanical backup unlocking function, in this case acting on the pawl 25 of the latch 32, allowing in a single command to unblock the two kinematic chains for locking and unlocking the door leaf.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A locking mechanism of a motor vehicle door leaf comprising:

a locking latch of the motor vehicle door leaf comprising a pawl and a bolt configured to cooperate such that locking or unlocking of the door leaf is allowed;

an electric actuator;

a transmission arrangement configured to transmit a movement of the electric actuator to the bolt in order to displace the bolt of the locking latch between an unlocking position wherein the bolt is released from the pawl and a locking position wherein the bolt is locked by the pawl, the transmission arrangement comprising:

a downstream transmission member configured to transmit a movement to the bolt, an upstream transmission member configured to transmit a movement from the electric actuator to the downstream transmission member; and a blocking member movable relative to the downstream transmission member and/or the upstream transmission member, the blocking member being configured to define with the upstream transmission member:

a relative blocking position wherein the blocking member cooperates with the upstream transmission member such that a transmission of a movement between the upstream transmission member and the downstream transmission member is allowed, and a relative unblocking position wherein the blocking member is movable according to at least one degree of freedom with respect to the upstream transmission member, wherein the blocking member comprises a cam surface configured to allow a displacement of the blocking member under a thrust from the upstream transmission member such that the upstream transmission member and the blocking member are positioned in the relative blocking position, wherein the blocking member is movable between an open position wherein the upstream transmission member is allowed to move from the relative blocking position to the relative unblocking position and a closing position in which the blocking member is opposed to the displacement from the relative blocking position to the relative unblocking position, wherein the blocking member comprises a contact surface configured to come into contact with the upstream transmission member, the blocking member being guided between the closing position and the open position along a path comprised in a plane of the contact surface, wherein the blocking member is movable in rotation about an axis of rotation, the contact surface being oriented perpendicular to a segment connecting the axis of rotation to the contact surface.

2. The locking mechanism according to claim 1, wherein the blocking member is connected to a mechanical backup system, the mechanical backup system being configured to trigger a displacement of the blocking member and of the upstream transmission member between the relative blocking position and the relative unblocking position.

3. The locking mechanism according to claim 1, further comprising a return device configured to exert a return force on the blocking member towards the closing position of the blocking member.

4. The locking mechanism according to claim 1, further comprising a stop configured to block the blocking member in the closing position.

5. The locking mechanism according to claim 1, wherein the blocking member is configured to be displaced from the closing position to the open position by mechanical traction of a mechanical backup system.

6. The locking mechanism according to claim 1, wherein the cam surface is configured to displace the blocking member between the closing position of the blocking member and the open position of the blocking member under a thrust of the upstream transmission member.

7. A motor vehicle comprising a locking mechanism of a motor vehicle door leaf according to claim 1.

* * * * *